Inventors
Glenn R. Schaer
William F. Scharenberg, Jr.

By

*Lime DGrim*

Attorney ns
3,512,247
PROCESS FOR PRODUCING SPINNERETTES

Glenn R. Schaer and William F. Scharenberg, Jr., Columbus, Ohio, assignors to Celanese Corporation, New York, N.Y., a corporation of Delaware
Filed Nov. 16, 1966, Ser. No. 594,789
Int. Cl. B23p *17/00*
U.S. Cl. 29—527.6            14 Claims

ABSTRACT OF THE DISCLOSURE

A method for the production of a master mold to produce a spinnerette which comprises arranging a plurality of projections projecting from a base in a prescribed placement so as to correspond to the orifices of the desired spinnerette, said projections having outside surfaces conforming to the desired shape of said orifices, depositing a molding material about said projections in a manner to provide a single unitary mold containing said projections and removing said projections from said mold to provide depressions corresponding in length and design to said projections. In a preferred method a master mold is produced which has a plurality of identical depressions. This is accomplished by utilizing a projection of a predetermined shape and length and depositing molding material about said projection. After the molding material has been deposited, the projection is removed leaving a molded unit having a hollow portion, or depression. A plurality of such molded units made from the same projection is then arranged and maintained so as to correspond to the orifices of the desired spinnerette. The master molds themselves can be machined to form a spinnerette.

---

This invention relates to a novel method of making a master mold to produce a spinnerette and to a novel method for the production of a spinnerette. More particularly the invention is directed to a method of making a master mold for a spinnerette wherein a negative mold of a spinnerette can be produced and subsequently exact duplicate spinnerettes can be reproduced from said negative mold. Furthermore, the master mold produced herein can be converted directly into a spinnerette by the required machining.

Spinnerettes for use in the manufacture of fibrous materials usually comprise a disc or cup shaped extrusion device provided with one or more, usually five or more (e.g., 5 to 800 or higher) minute orifices through which the organic viscous filament-forming material is extruded under pressure into a coagulating zone which may, depending on the type of spinning employed, be an evaporative zone (dry-spinning), a zone containing a liquid coagulant (wet-spinning), or a cooling zone (melt-spinning). These orifices can have diameters less than 1000 microns, usually less than 400 microns and can have lengths less than 800 microns long. These orifices can be various shapes, e.g., circular, triangular, T-shape and the like and in the length can be straight, countersunk, double countersunk, parabolic, hyperbolic, etc. It is essential that the walls of such orifices be smooth so that the viscous extrusion mass may flow freely over such walls to provide uniform filaments.

It is customary to produce spinnerette orifices by drilling, grinding or punching a preformed spinerette blank, disc or cup. Following these procedures it is extremely difficult, time consuming and practically impossible to provide a spinnerette in which all the orifices are uniform in both longitudinal and transverse section. The production of spinnerettes for dry-spinning and wet-spinning is particularly difficult and exacting because of the extremely minute size of those portions of the orifices which are of the smallest diameter. These portions, usually known as the capillary portions of the orifices, may have diameters in the range, for example, of 15–200 microns and, in the case of spinnerettes used for dry-spinning, usually less than 50 microns. The lengths of these capillary portions are, for example, above about 5 microns and below about 150 microns, usually less than 50 microns. The capillary portions may be of various cross-sections, e.g., circular, triangular, square, Y-shaped, cruciform, star-shaped and the like. The thickness of a dry spinning spinnerette is usually above about 0.02 inch, e.g., about 0.03 to 0.1 inch.

In a copending application, Ser. No. 354,031, filed Mar. 23, 1964, now Pat. No. 3,332,858, assigned to the same assignee, there is a process described for the production of spinnerettes by forming a mold, i.e., a negative of the spinnerette, sensitizing the mold to make it conductive, depositing a metal on the mold and removing by machining the excess deposited metal to expose the orifices and produce a desired spinnerette. Reference in this copending application was made to a method of making a master by carefully machining in a metal cup space orifices from which the negative spinnerette mold was made. This method of making the master is tedious and difficult to make uniform orifices.

A novel approach of making a master has been devised by this invention to produce improved spinnerettes as to uniformity and reproducibility. This method utilizes a plurality of male projections in a prescribed placement so as to correspond to the orifices of the desired spinnerette. These male projections have smooth-finished outside surfaces which conform to the desired shape of the orifices. These male projections can be individually made and more easily worked on to provide smoother surfaces than the inside of orifices. These male projections can be held in their predetermined positions by clamps, magnetism, etc. while molding material is deposited about these projections in a manner to provide a single unitary mold. After the mold is formed the male projections are removed to provide holes corresponding in length and design to said male projections. The master mold as now exists can be utilized to produce a negative mold of the spinnerette. In a preferred manner, the plurality of male projections utilized are arranged from the same base line in the same plane as the inside face of the spinnerette mold so as to provide a flat surface therein. After the projections have been removed and a negative spinnerette mold formed, the base from which project the positive projections in the negative mold which in turn form the orifices, is in the form of a flat surface representing a base line in the inside face of the spinnerette from which the finel spinnerette can be machined to remove the excess molding material from the hollow projections of the final spinnerette so as to provide the identical length of the spinnerette orifices. The upper portion of the master mold, i.e., opposite end from said orifices, can be in form of a cup to hold the molding material for the negative mold. It should also be readily apparent that if the master mold were machined so that the molding material covering the hollow projections were removed to expose the orifices a workable spinnerette from the master mold itself is formed. A distinct feature of this process relates to the feasibility of reproducing exact duplicates of a negative spinnerette mold, which in turn produces exact duplicates of spinnerettes.

Another distinct advantage of the invention described herein is the production of a master mold spinnerette which has a plurality of identical orifices, i.e., a plurality of an exact replica of one orifice. This is accomplished by utilizing a highly polished male projection of a predetermined shape and length and depositing molded material about said projection. After the molding material has been deposited, the male projection is removed, leaving a molding unit having a hollow portion. The sides of the hollow portion of the molded unit is an exact duplicate of the outside surface of the male projection used. A plurality of molded units made from the same male projections are then arranged and maintained in a prescribed placement so as to correspond to the orifices of the desired spinnerette. A negative mold of a spinnerette having identical positive projections in length and design can be made from this arrangement. In a preferred manner, a plurality of molded units made from a single male projection can be arranged from the same base line in the same plane as the inside face of the spinnerette mold so as to provide a flat surface therein. This flat surface can be used as a base line from which the final spinnerette can be machined to remove the excess molding material from the hollow projections to provide the identical length of each of the spinnerette orifices. After the molded units have been prearranged in the desired order, molding material is deposited about the molded units in a manner to provide a single unitary master mold, preferably with its base in the form of a cup, the master mold can be used to produce a negative spinnerette mold at this point or the master mold can be machined, i.e., uniformly removing the molding material from the molded units to expose the orifices to form a working spinnerette which can be used as the master mold to form the desired negative spinnerette mold.

The molding material which can be used in preparing the master molds of this invention can include plastics such as epoxy resins, oxymethylene polymers such as Celcon®, clay and the like as well as metals which can be deposited by chemical or electrolytic methods over the starting base of said mold. The type of molding material which can be used is dictated by the end use which the master mold is to be used. The preferred method of making the mold is a standard electroforming technique which is well known to those skilled in the art. This technique can deposite metals at the desired location and in general metals, such as nickel, are preferred in the manufacture of the desired spinnerette masters.

To further illustrate the invention, reference is made to the accompanying drawing wherein.

Figure 3:
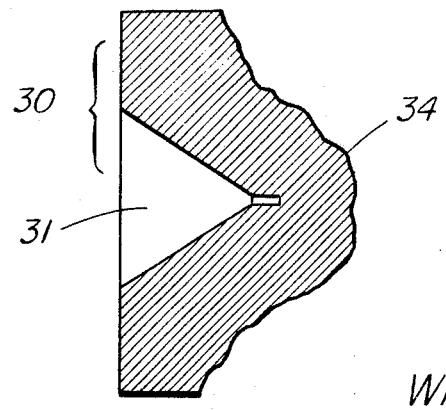

FIG. 3 indicates a cross-section of an electroformed hollow molded unit wherein the male projection was removed.

Figure 1:
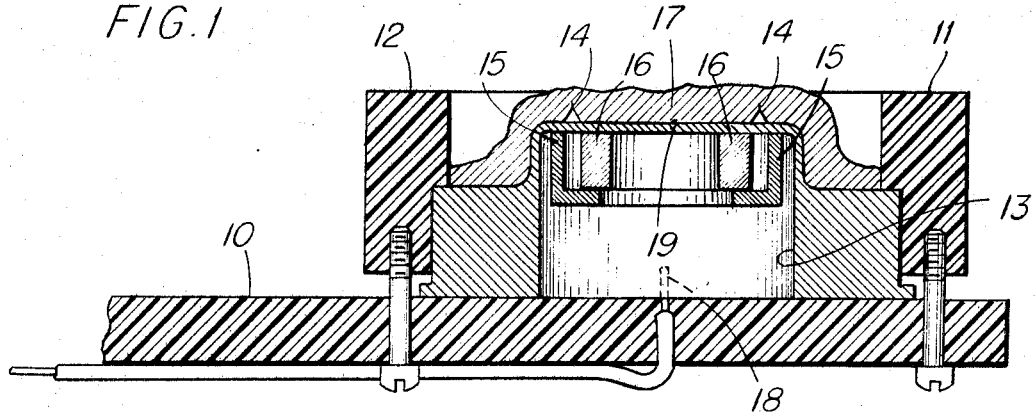
FIG. 1 illustrates a cross-section of a magnetic mandrel with electrodeposit showing location of male projections in an electroformed master.

Referring to FIG. 1, a plastic support 10 holds a plastic shield (cross-sections are shown in 11 and 12) in which is contained a holder 13 for the male projection 14. An iron pole piece 15 and a ferrite magnet 16 holds the male projection 14 in place while a layer 17 of nickel is electrodeposited over the male projection 14 and the outside portion of holder 13 while the whole unit is immersed in a sulfamate nickel plating bath (not shown). The electrical current required is supplied through the electrical contact 18. After the nickel layer is deposited, the male projections 14 are removed, leaving an orifice corresponding to the design and shape of the outside surface of said male projections 14. The rough master is then removed from the holder and the surface layer 17 removed by machining preferably in a flat surface until the hollow portion left by the tip of the male projection 14 is exposed leaving a spinnerette orifice. It should be noted that the shaped portions of the male projections 14 are placed from the same base line in the same plane as the inside face 19 of the spinnerette mold. This is to provide holes having the same length capillaries after machining the excess nickel layer 17 to a flat surface using the parallel base line 19 for comparison.

Figure 2:
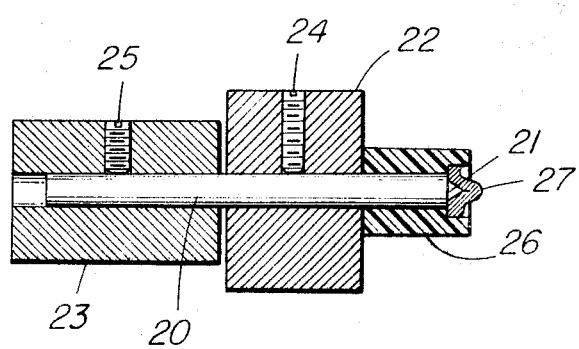
FIG. 2 illustrates a partial cross-section of a fixture for electroforming a male projection into a hollow molded unit.

FIG. 2 demonstrates a partial cross-section of a fixture used for electroforming an individual hollow electroform. This fixture consists of a machined male projection 20 having a funnel shaped head 21, contained within two stainless steel collars 22 and 23 maintaining the male projection 20 into place by set screws 24 and 25. A plastic tube 26 surrounds the funnel shaped head 21 and a nickel coated layer 27 covers the funnel shaped head 21. After the appropriate amount of nickel has been deposited over the funnel shaped head 21, the male projection 20 is removed to form an electroformed unit 30 as shown in FIG. 3. This electroformed unit in FIG. 3 has the hollow funnel shaped hole 31 in the nickel 34. A plurality of electroformed units 30 such as shown in FIG. 3 can be arranged in a device as shown in FIG. 1 on the holder 14 of FIG. 1 in a predescribed manner and coated with nickel in the manner described hereinbefore. This technique permits the use of a plurality of molded units as shown in FIG. 3 which are replicas of a single male projection to provide identical surfaced holes for the master spinnerette. The nickel master spinnerette can be used to produce an electroforming mandrel by pouring a polymeric material into the master spinnerette, permitting the polymeric material to harden, removing the molded mandrel and sensitizing the mandrel to make it conductive and depositing nickel on the mandrel, removing the mandrel and removing the excess nickel layer by machining away the nickel until the hollow shaped orifices of the spinnerette are exposed. Thus an identical spinnerette can be reproduced until the mold needs replacing.

After the molding material has been deposited to provide the master mold, the finishing of the mold can be effected by grinding, chemical milling, electrolytic grinding, electric discharge machining or other suitable methods. In the case of electroformed master molds the metal deposited mold can be mounted on a rotatable chuck of a precision lathe with the face of the electroformed deposit disposed at right angles to the axis of rotation of the chuck. The grinding wheel of a precision grinder, e.g., a tool post grinder of a known type, is then brought in contact with the electrodeposit material in a parallel plane to the flat surface of the inside face of the master spinnerette to remove a surface layer of the metal and expose the orifices. In this manner a uniform length of each of the orifices can be obtained utilizing a predetermined flat surface as a base of reference. To minimize any tearing or filling of the orifice outlets by the grinding operation the depressions in the unfinished electroformed deposit can be filled before the final machining, with a suitable filler such as wax, epoxy resins, rubbery polymer which is removed after the machining operation by chemical decomposition or by heat. Such filling can be carried out before the orifices are exposed or when the orifices have been first exposed and before the final finishing of the outer surface. After grinding, the outer surfaces may be buffed or lapped to bring it to a high polish and remove any burrs.

In the electroforming process used herein, any type of electroplating solution can be used but the preferred type is nickel electroplating solution. Typical of the nickel electroplating solutions which can be used for example, is one containing 40 ounces per gallon of nickel sulfate, 7 ounces per gallon of nickel chloride and 6 ounces per gallon of boric acid. Another suitable plating solution contains nickel sulfamate. The plating solutions and methods of using them for electroforming are well known in the art; see for example, the book "Symposium on Electroforming—Applications, Uses and Properties of Electroformed Metals" published by American Society for Testing and Materials in 1962 and particularly the chapter on "Modern Electroforming Solutions and Their Applications" by Diggin in that book. Typical plating conditions, in which those articles to be plated are used as a cathode, use a bath temperature of 140° F., a bath pH of 4.0, air agitation of the bath during plating, anodes of depolarized rolled carbon nickel with anode bags, a plating rate of about 40 minutes per mil and current density of 30–40 amperes per square foot. The bath may also be agitated ultrasonically. It is also to be understood that in place of nickel other metals can be used, e.g., iron, cobalt, copper or suitable alloys. The thickness of the metal on the master mold is not necessarily critical and a preferred average thickness can range from 0.03 to 0.5 inch.

It is understood that the foregoing description is merely illustrative of preferred embodiments of the invention of which many variations may be made by those skilled in the art within the scope of the following claims without departing from the spirit thereof.

What is claimed is:

1. A method for the production of a master mold to produce a spinnerette which comprises arranging a plurality of male projections in a prescribed placement, projecting from the same base line in the same plane as the inside face of said spinnerette mold, said male projections having outside surfaces conforming to the desired shape of the orifices of the spinnette, depositing a molding material about said projections in a manner to provide a single unitary mold covering said male projections and said base, and removing said male projections and said base from said mold to provide depressions in said mold corresponding in length and design to said male projections.

2. The method of claim 1 wherein the mold is machined to remove the molding material covering said depressions to form orifices from said depressions to form a spinnerette.

3. The method of claim 1 wherein the molding material is deposited metal.

4. The method of claim 3 wherein the metal is deposited by electroforming techniques.

5. The method of claim 4 wherein the metal is nickel.

6. The method of claim 4 wherein the metal mold is machined to remove the metal covering the depressions to form orifices from said depressions to form a spinnerette.

7. A method for the production of a master mold to produce a spinnerette which comprises forming an individually molded unit by using a male projection in which the outside surface conforms to the desired shape of the orifices of the spinnerette and depositing a molding material about said male projection to form a molded unit and withdrawing said projection to provide a molded unit with a depression corresponding in length and design to said male projection, arranging and maintaining a plurality of said molded units in a prescribed placement so as to correspond to the orifices of the desired spinnerette.

8. A method for the production of a master mold to produce a spinnerette which comprises forming an individual molded unit by using a male projection in which the outside surface conforms to the desired shape of the orifices of the spinnerette and depositing a molding material about said male projection to form a molded unit and withdrawing said projection to provide a depression corresponding in length and design to said male projection, arranging and maintaining a plurality of said molded units in a prescribed arrangement so that the base line of each of said molded units is in the same plane as the inside face of said spinnerette mold.

9. The process of claim 8 wherein a deposit of molding material is placed about the plurality of molding units to provide a single unitary mold containing said molding units.

10. The process of claim 9 wherein the molding material is deposited metal.

11. The method of claim 10 wherein the metal is deposited by electroforming techniques.

12. The method of claim 11 wherein the metal is nickel.

13. The method of claim 10 wherein the metal mold is machined to remove the metal covering the depressions to form orifices from said depressions to form a spinnerette 14. The process of claim 8 wherein the mold is machined to remove said molding material covering said depressions to form orifices from said depressions to form a spinnette.

References Cited

UNITED STATES PATENTS

| | | | |
|---|---|---|---|
| 1,986,637 | 1/1935 | L'Hollier | 204—4 |
| 2,148,221 | 2/1939 | Schneider | 72—30 |
| 3,060,500 | 10/1962 | Spellman | 117—105.2 X |
| 3,087,043 | 4/1963 | Hofer | 219—69 |
| 3,332,858 | 7/1967 | Bittinger | 204—11 |

PAUL M. COHEN, Primary Examiner

U.S. Cl. X.R.

18—8; 204—59